United States Patent Office 3,242,166
Patented Mar. 22, 1966

3,242,166
BIS(PERFLUOROALKYL)DIAZOMETHANE AND
PREPARATION THEREOF
Carl G. Krespan and William J. Middleton, Wilmington, Del., assignors to E. I. du Pont de Nemours and Company, Wilmington, Del., a corporation of Delaware
No Drawing. Filed May 26, 1965, Ser. No. 459,120
6 Claims. (Cl. 260—239)

This application is a continuation-in-part of our copending U.S. application, Serial No. 386,042, filed July 29, 1964.

This invention is concerned with new chemical compounds and with a process for their preparation.

The compounds of this invention are perfluoroalkyldiazomethanes of the general formula $R_fR_f'CN_2$, i.e.

wherein $R_f$ and $R_f'$, which can be alike or different, are lower (1–6 carbon atoms) perfluoroalkyl groups, preferably perfluoromethyl. They are prepared from the corresponding hydrazones by oxidation with lead tetraacetate.

The products and process of this invention may be represented by the following equation:

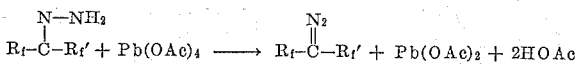

wherein $R_f$ and $R_f'$ each represent a lower perfluoroalkyl group. This oxidation reaction is carried out by mixing the hydrazone with lead tetraacetate in an organic reaction medium under anhydrous conditions and at a temperature in the range −25° C. to 100° C. The preferred temperature range is 0° C. to 40° C. Any stoichiometric excess of lead tetraacetate may be used. However, a molar ratio of from 1.0 to 1.5 of lead tetraacetate to hydrazone is preferred. Pressure and time of reaction are not critical factors. The products may be isolated and purified by ordinary conventional methods, e.g., distillation.

Operable reaction media include hydrocarbon carbonitriles such as benzonitrile and acetonitrile; aromatic and chloro-aromatic compounds such as benzene, toluene, xylene, chlorobenzene, and o-, m-, and p-chlorotoluene; carboxylic acids such as acetic acid and propionic acid; acid anhydrides such as acetic anhydride and propionic anhydride; esters such as methyl formate, ethyl acetate, and methyl propionate; and ethers such as dimethyl ether, diethyl ether, di-n-butyl ether, and tetrahydrofuran. The preferred reaction media are the hydrocarbon carbonitriles, particularly benzonitrile and acetonitrile.

The hydrazones used as starting materials in the above depicted reaction can be prepared by the method described in copending application Serial Number 250,501, filed January 10, 1963.

The following examples describe various embodiments of the invention in greater detail. It is to be understood that these embodiments do not comprise the entire invention, but rather are intended to be illustrative of a broader inventive concept for which protection by the patent laws is being sought. The invention in its broader context finds supporting disclosure throughout the entire specification, not in the examples alone.

Example I

A. *Bis(trifluoromethyl)diazomethane:*

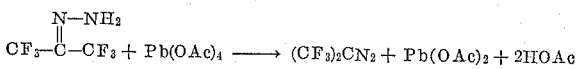

A solution of 9 g. (0.058 mole) of hexafluoroacetone hydrazone in 10 ml. of benzonitrile was added dropwise with stirring to a suspension of 26 g. (0.058 mole) of lead tetraacetate (obtained from 30 g. of commercial lead tetraacetate after removing the acetic acid by drying under reduced pressure) in 75 ml. of benzonitrile. The reaction mixture was kept under an atmosphere of nitrogen and cooled in an ice bath. When the addition was completed, the reaction mixture was stirred for one hour at room temperature. The most volatile material was distilled from the mixture at 10 mm. of pressure and collected in a trap cooled to −78°. Distillation of the material in trap gave 4.5 ml. (about 6.8 g.) of bis(trifluoromethyl)diazomethane, B.P. 12–13° C. as a yellow liquid. The infrared spectrum contained a band at 4.68μ. The $F^{19}$ NMR spectrum (56.4 mc.) contained a singlet at +3400 c.p.s. from fluorotrichloromethane.

*Analysis.*—Calcd. for $C_3F_6N$: F, 64.02. Found: F, 64.07.

B. *Triphenylphosphine adduct:*

$$(CF_3)_2CN_2 + \phi_3P \rightarrow \phi_3P=N-N=C(CF_3)_2$$

Bis(trifluoromethyl)diazomethane was further identified by preparing a triphenylphosphine adduct. A solution of 1.0 g. (0.0056 mole) of bis(trifluoromethyl)diazomethane in 5 ml. of methylene chloride cooled to 0° C. was mixed with a solution of 2.14 g. (0.0056 mole) of triphenylphosphine in 7 ml. of methylene chloride. The reaction was allowed to remain at 0° C. until most of the yellow color faded and a white precipitate formed (about 10 minutes). The mixture was cooled to about −30° C. and the suspended white solid was collected on a filter and washed with cold carbon tetrachloride. There was obtained 3.05 g. of the phosphazine as white plates, M.P. 137–138° C. The $F^{19}$ NMR spectrum contained a multiplet centered at −175 c.p.s. from 1,2-dichloro-1,1,2,2-tetrachloroethane.

*Analysis.*—Calcd. $C_{21}H_{15}F_6N_2P$: C, 57.28; H, 3.44; F, 25.88; N, 6.37; P, 7.04. Found: C, 57.09; H, 3.79; F, 25.78; N, 6.68; P, 6.82.

Bis(trifluoromethyl)diazomethane is not shock or static sensitive. It did not detonate when an 8.33 g. steel ball was dropped 45 inches on to a tool steel surface coated with the liquid, nor did it detonate when a 500 μf. condenser charged with 30 kv. was discharged through a gas sample of the compound.

Example II

A. *Bis(pentafluoroethyl)diazomethane:*

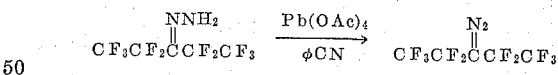

A 15-gram sample of lead tetraacetate (commercial, containing an acetic acid stabilizer) was placed in a 250 ml. flask and the stabilizer was removed under reduced pressure. A 75-ml. portion of benzonitrile was added and the resulting solution stirred and cooled in an ice bath while 6 g. of perfluoro-3-pentanone hydrazone dissolved in 5 ml. of benzontrile was added dropwise over 15 minutes. After stirring at room temperature for ½ hour, the most volatile material was isolated by distillation at 1 mm. into a "Dry Ice"-acetone trap. There was obtained 3.0 ml. (about 4.5 g.) of bis(pentafluoroethyl)diazomethane, B.P. 56–57°. The infrared spectrum contained a band at 4.72μ. The $F^{19}$ NMR spectrum (56.4 mc.) contained a broadened signal at +1009 c.p.s. (area 3) and one at +2375 c.p.s. (area 2) from 1,2-difluoro-1,1,2,2-tetrachloroethane.

B. *Triphenylphsophine adduct:*

$$(CF_3CF_2)_2CN_2 + \phi_3P \rightarrow \phi_3P=N-N=C(C_2F_5)_2$$

Bis(pentafluoroethyl)diazomethane was further identified by preparing a triphenylphosphine adduct. A 1.5 g. sample of bis(pentafluoroethyl)diazomethane suspended in 5 ml. of methylene chloride was added at 0° C. to 3 g.

of triphenylphosphine dissolved in 10 ml. of methylene chloride. The mixture was kept at 4° C. for 16 hours and cooled in a "Dry Ice" bath to induce crystallization of a white solid. The phosphazine, 3.15 g. collected on a filter and washed with cold carbon tetrachloride melted at 118–120° C. The infrared spectrum showed strong absorption in the $CF_3$ region. The $F^{19}$ NMR (56.4 mc.) exhibited multiplets at +733 (area 3), +747 (area 3), +2229 (area 2) and +2605 (area 2) c.p.s. from 1,2-dichloro-1,1,2,2-tetrachloroethane. The ultraviolet spectrum was $\epsilon$(284 m$\mu$) 16,700, (273 m$\mu$) 16,300, (268 m$\mu$) 15,300 and (223 m$\mu$; sh.) 25,000. The $H^1$ NMR had a multiplet at $\tau$=2.4.

*Analysis.*—Calcd. for $C_{23}H_{15}N_2F_{10}P$: C, 51.12; H, 2.80; N, 5.19; F, 35.17; P, 5.72. Found: C, 51.06; H, 2.81; N, 5.40; F, 36.02; P, 5.83.

When perfluoro-2-butanone hydrazone, perfluoro-5-nonanone hydrazone and perfluoro-7-tridecanone hydrazone are oxidized in the manner illustrated above by Examples I–A and II–A, trifluoromethylpentafluoroethyldiazomethane, bis(perfluorobutyl)diazomethane and bis(perfluorohexyl)diazomethane respectively are obtained thereby The compounds of this invention are useful as chemical intermediates. They can be converted by pyrolysis to perfluoroalkyl ethylenes which can be converted in turn to the corresponding alcohols. The resultant alcohols are useful solvents for polyoxymethylene resins. Example III illustrates the utility of this invention.

*Example III*

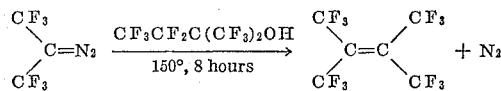

A 4.0 ml. (5.9 g.) sample of bis(trifluoromethyl)diazomethane and 37.5 g. of octafluoro-2-(trifluoromethyl)-2-butanol was heated in a "Hastelloy" bomb tube for 8 hours at 150°. The recovered liquid was distilled giving 3.1 g. of liquid, B.P. 50–58°. This was shown by infrared and $F^{19}$ NMR comparisons to be mainly tetrakis(trifluoromethyl)ethylene.

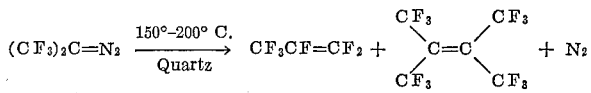

The pyrolysis of bis(trifluoromethyl)diazomethane over quartz at 150° or 200° (one-half min. contact time) gave hexafluoropropene and tetrakis(trifluoromethyl)ethylene as the major products. These products were identified after isolation by gas chromatography by comparison of their infrared spectra with authentic samples.

Tetrakis(trifluoromethyl)ethylene can be converted to 3H-dodecafluoro(2,3-dimethyl-2-butanol) by hydration, as described in copending application Serial Number 238,703, filed November 19, 1962.

The compound 2,2,2-trifluorodiazoethane, $CF_3CHN_2$, is known in the art [H. Gilman & R. G. Jones. J. Am. Chem. Soc., 65, 1458 (1943)]. These authors describe its preparation by the reaction of 2,2,2-trifluoroethylamine hydrochloride with sodium nitrite. This diazo compound reacts normally with iodine to give $CF_3CHI_2$. The compounds of this invention do not react with iodine under the same conditions. They are perfluoro compounds and give perfluorocarbenes on decomposition, whereas $CF_3CHN_2$ contains hydrogen and cannot give a perfluorocarbene on decomposition. Furthermore, no useful solvents for polyoxymethylene resins can be prepared from $CF_3CHN_2$.

The preparation of $\phi_3P=CF_2$ by the reaction of $\phi_3P$ with $CF_3NO$ and $NH_3$ has been reported [S. P. Makarov, A. J. Yakubovich et al., Doklady Akad. Nauk. SSSR, 141, 357–60 (1961), No. 2]. In this paper difluorodiazomethane, $CF_2N_2$, is postulated as an intermediate. However, this compound was not isolated.

The compounds of this invention, on the other hand, can be isolated. They react with triphenylphosphine to give stable adducts with retention of nitrogen (see Example I–B), an unexpected behavior in view of the Makarov et al. article. Also, difluorodiazomethane could not be used, as are the present compounds, to prepare fluoroalcohol solvents useful for dissolving polyoxymethylene resins, since coupling of the carbene derived from $CF_2N_2$ would give tetrafluoroethylene and hydrolysis of tetrafluoroethylene is known to give difluoroacetic acid.

The compounds of this invention are surprisingly unreactive toward acidic materials, but they do react with certain basic reagents.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $R_fR_f'CN_2$ wherein $R_f$ and $R_f'$ each represent a perfluoroalkyl group of up to and including six carbon atoms.

2. A compound as defined by claim 1 wherein $R_f$ and $R_f'$ are alike.

3. Bis(trifluoromethyl)diazomethane.

4. Bis(pentafluoroethyl)diazomethane.

5. Process which comprises oxidizing a hydrazone of the formula $R_fR_f'C=N-NH_2$ wherein $R_f$ and $R_f'$ each represent a lower perfluoroalkyl group by contacting same with lead tetraacetate in an organic reaction medium, under anhydrous conditions, and at a temperature in the range of −25° C. to 100° C.

6. A process as defined by claim 5 wherein said reaction medium represents a hydrocarbon carbonitrile and wherein said temperature is in the range of 0° C. to 40° C.

No references cited.

NICHOLAS S. RIZZO, *Primary Examiner.*